No. 868,310. PATENTED OCT. 15, 1907.
A. P. WHITE & P. M. WEGE.
METALLIC CASE AND LIKE DEVICE.
APPLICATION FILED JUNE 13, 1907.

No. 868,310. PATENTED OCT. 15, 1907.
A. P. WHITE & P. M. WEGE.
METALLIC CASE AND LIKE DEVICE.
APPLICATION FILED JUNE 13, 1907.
10 SHEETS—SHEET 4.

Attest:
C. O. Mitchell
Q. L. O'Brien

Inventors:
Alexander P. White
& Peter M. Wege
by Barney, Brickenstein
& Ogden Attys.

No. 868,310.
PATENTED OCT. 15, 1907.
A. P. WHITE & P. M. WEGE.
METALLIC CASE AND LIKE DEVICE.
APPLICATION FILED JUNE 13, 1907.

Attest:
Inventors:
Alexander P. White
Peter M. Wege
by Burney, Brickenstein & Ogden
Attys.

No. 868,310. PATENTED OCT. 15, 1907.
A. P. WHITE & P. M. WEGE.
METALLIC CASE AND LIKE DEVICE.
APPLICATION FILED JUNE 13, 1907.

No. 868,310. PATENTED OCT. 15, 1907.
A. P. WHITE & P. M. WEGE.
METALLIC CASE AND LIKE DEVICE.
APPLICATION FILED JUNE 13, 1907.

Attest:

Inventors:
Alexander P. White and Peter M. Wege
by Binney, Brickenstein & Ogden
Attys.

No. 868,310.  
PATENTED OCT. 15, 1907.  
A. P. WHITE & P. M. WEGE.  
METALLIC CASE AND LIKE DEVICE.  
APPLICATION FILED JUNE 13, 1907.  
10 SHEETS—SHEET 9.

Attest:  
C. O. Mitchell  
A. L. O'Brien

Inventors:  
Alexander P. White and Peter M. Wege  
by Binney, Brickenstein & Ogden  
Attys.

No. 868,310.

PATENTED OCT. 15, 1907.

A. P. WHITE & P. M. WEGE.
METALLIC CASE AND LIKE DEVICE.
APPLICATION FILED JUNE 13, 1907.

UNITED STATES PATENT OFFICE.

ALEXANDER P. WHITE, OF CALDWELL, NEW JERSEY, AND PETER M. WEGE, OF YOUNGSTOWN, OHIO, ASSIGNORS TO THE GENERAL FIREPROOFING COMPANY, OF YOUNGSTOWN, OHIO, A CORPORATION OF OHIO.

METALLIC CASE AND LIKE DEVICE.

No. 868,310.  Specification of Letters Patent.  Patented Oct. 15, 1907.

Application filed June 13, 1907. Serial No. 378,701.

*To all whom it may concern:*

Be it known that we, ALEXANDER P. WHITE and PETER M. WEGE, citizens of the United States, and residents, respectively, of Caldwell, Essex county, New Jersey, and Youngstown, Ohio, have invented certain new and useful Improvements in Metallic Cases and Like Devices, of which the following is a specification accompanied by drawings.

This invention relates to metallic cases and like devices for books, or for filing purposes, although the invention may be used for any purpose to which it is found suitable.

The object of our invention is to improve upon the construction of such devices both in respect to strength and economy of production. Strength is an important advantage because cases of this kind are often subject to heavy weights and they must be capable of resisting them. Our construction is well adapted to this end, and another very important feature is that cases so made can be knocked down and transported without occupying much space. The parts are readily and quickly assembled and the individual parts can be made in quantities without fitting them during the course of construction—that is to say, parts for one hundred cases for example, may be struck up by machinery without reference to any particular cabinet or case and then the parts needed for a single case selected and made ready for shipment to the point where they are to be assembled into a structure for use.

Figures 5, 6, 7:
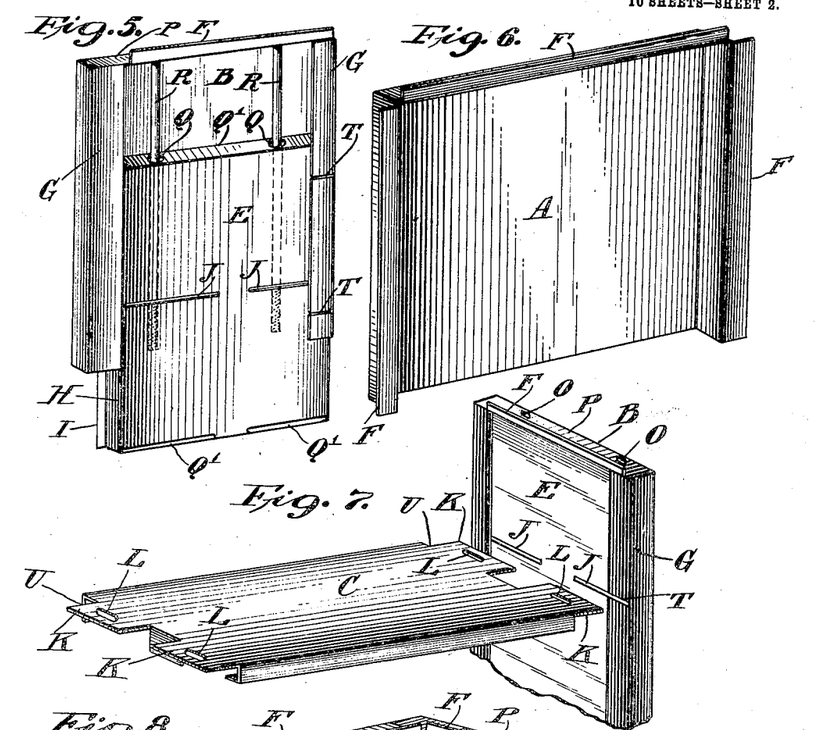
Fig. 5 is a detail perspective view of the one side of the case, showing the side panel partially inserted in the side.
Fig. 6 is a perspective view of the back of the case, looking from the front.
Fig. 7 is a detail perspective view partly broken away of one side and the shelf about to be assembled with the side.
Figure 8:
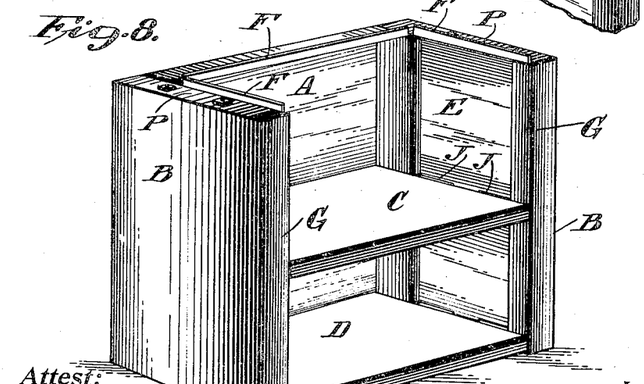
Fig. 8 is a perspective view of the case with the top removed.
Figure 18:
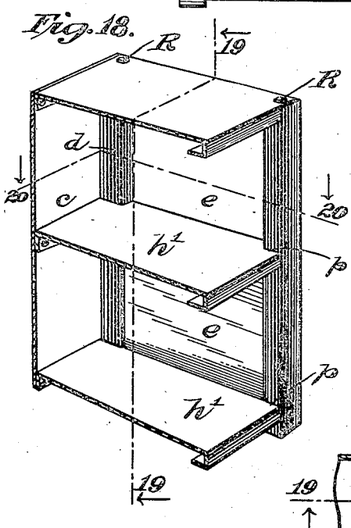
Fig. 18 is a vertical sectional view of the case on the line 18—18 of Fig. 17.
Figure 19:
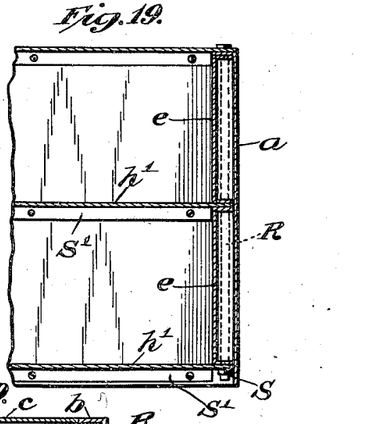
Fig. 19 is a vertical sectional view of Fig. 20 partly broken away on the line 19—19.
Figure 20:
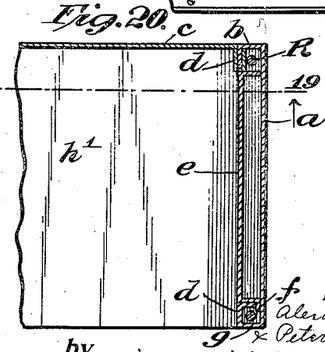
Fig. 20 is a horizontal sectional view partly broken away on the line 20—20 of Fig. 18.
Figure 21:
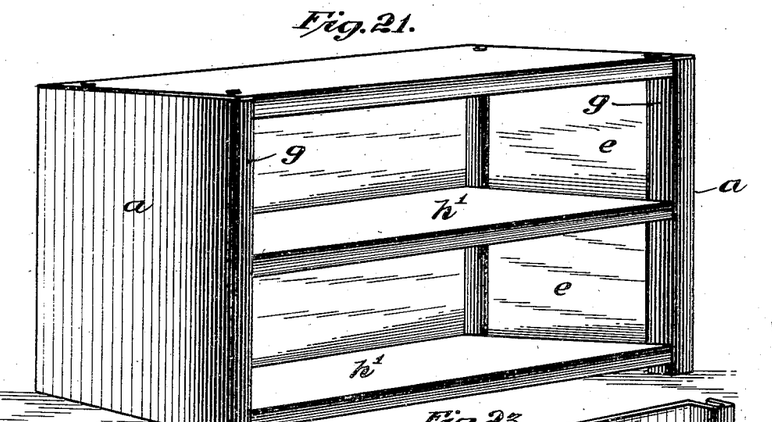
Fig. 21 is a perspective view of the case shown in Fig. 17.
Figures 22, 23, 24:
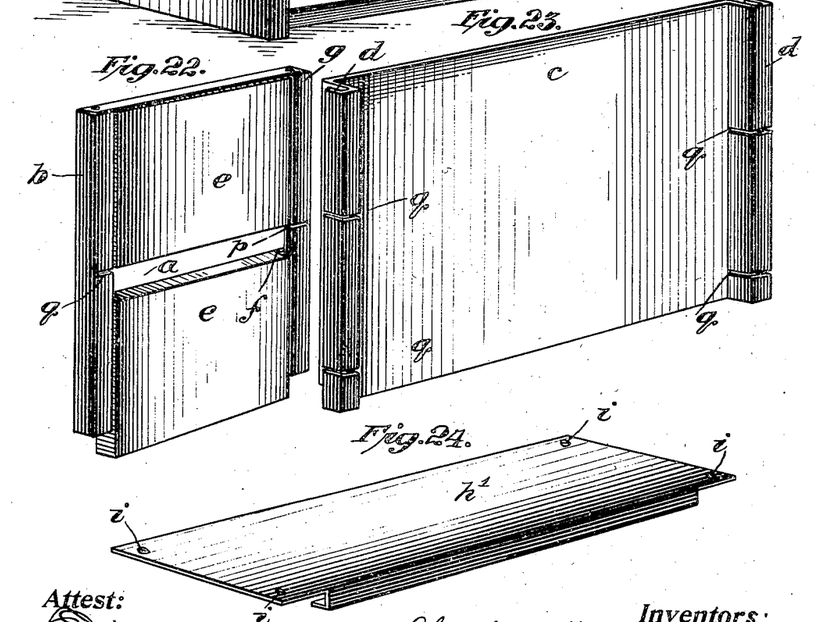
Fig. 22 is a perspective view of one of the sides.
Fig. 23 is a perspective view of the back.
Fig. 24 is a perspective view of the top.
Figure 36:
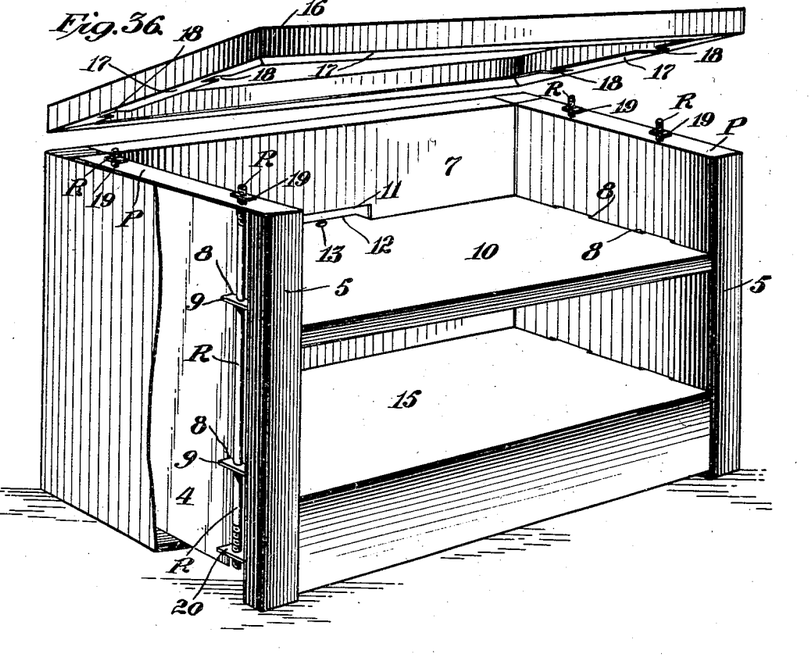
Fig. 36 is a perspective view partly broken away of the case having the cover removed.
Figure 37:
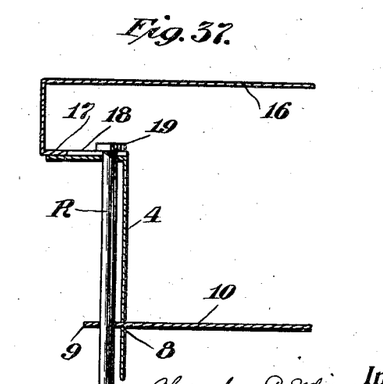
Fig. 37 is an enlarged detail vertical sectional view taken through the upper portion of one of the sides.

The characteristic feature of the invention is the novel combination of means by which the component parts of the structure are held in place by fastening the sides and shelves together with rods passing through apertures in shelves having portions extending into slots in the sides. In some examples the rods act in conjunction also with vertical flanges on the sides, in holding the parts in place as for instance, as shown in Figures 18 and 20 in which the rods are located adjacent the vertical flanges formed at the edges of the sides where the sides make corners. A portion of the shelf, containing an aperture, is extended into a slot in the flange and the rod located adjacent the interfitting flanges at the corner passes through the aperture in the extension of the shelf, thus effecting a combination by which the several parts are securely locked together. The rod may also pass through an aperture made in a horizontally flanged part of either the top or the bottom of the side as shown in Figs. 19 and 22, although this is not necessary where there is more than one shelf. In a modification of this construction the rods or some of them are located along the sides of the structure instead of at the corner, in which case, as is shown in Figs. 5 and 36, they have no relation to the corner flanges. In such cases one end or part of an end of the interior or exterior sheet forming a side is turned to form a horizontal flange. This flange is provided with an aperture to receive the rod. Passing through this aperture the rod goes through another aperture in the edge of the shelf. The edge of the shelf extends between the panels or through a slot in the interior wall of the side to receive the rod engaging the shelf which effects a combination by which the parts are held together. In this form of our invention it is obvious that the shelf need not be inserted in a slotted corner flange, and the slot in the flange may be omitted. The vertical flanges at the rear corners may also be omitted on this form although we prefer them because the flanges add to the strength and rigidity of the structure. If the top and bottom engage the rod the shelves need not be engaged by the rod especially if the structure be of small dimensions. The different forms may be combined in a single structure as for example one side may be constructed according to Fig. 10 and the other according to Figs. 18 and 19.

Figures 9, 10, 11, 12:
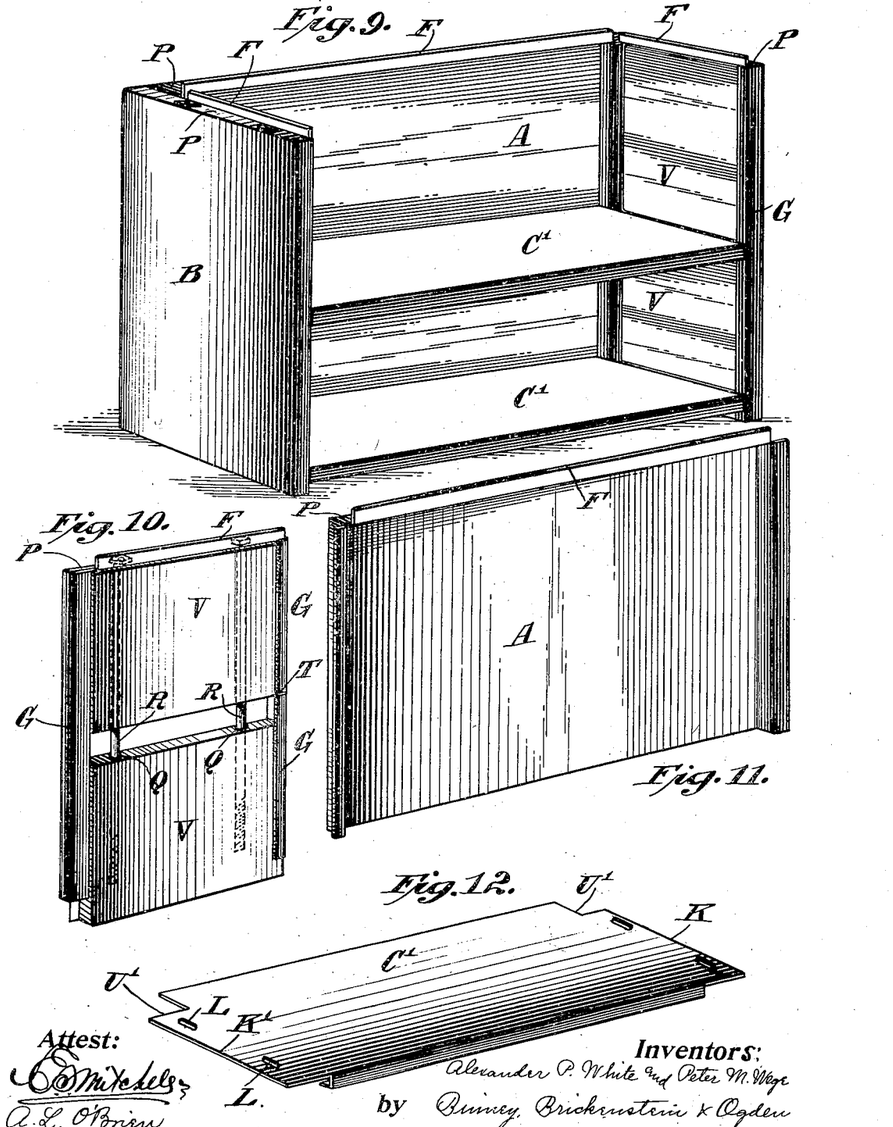
Fig. 9 is a perspective view of a modified form of the case, provided with two side panels in each side instead of one.
Fig. 10 is a detail perspective view of one side of the case shown in Fig. 9, with one panel partially inserted in the side.
Fig. 11 is a perspective view of the back of the case.
Fig. 12 is a perspective view of the shelf.
Figure 13:
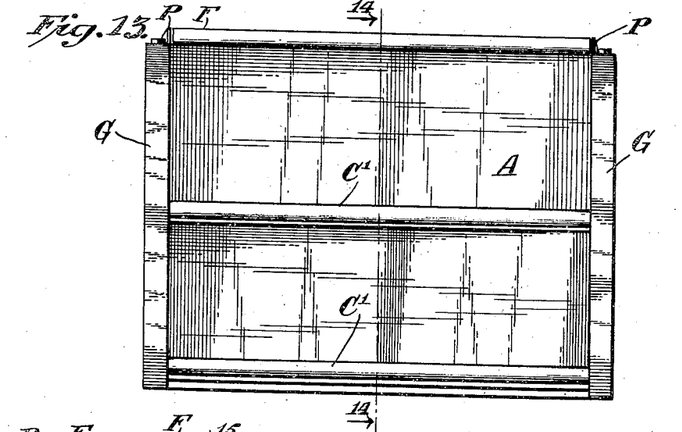
Fig. 13 is a front view of the case shown in Fig. 9.
Figure 14:
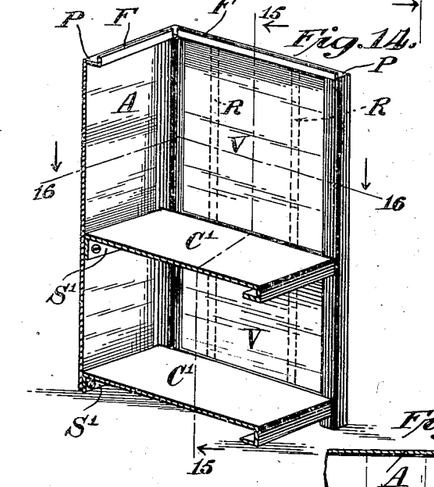
Fig. 14 is a vertical sectional perspective view on the line 14—14 of Fig. 13.
Figure 15:
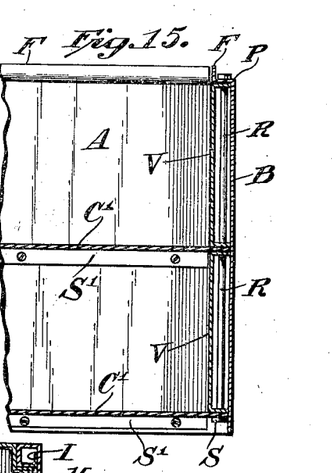
Fig. 15 is a vertical sectional view partly broken away on the line 15—15 of Fig. 14.
Figure 16:
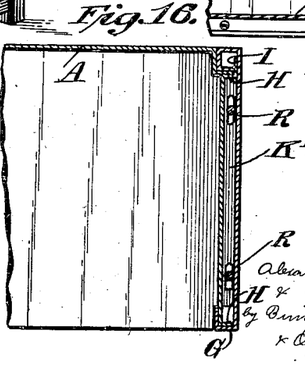
Fig. 16 is a horizontal sectional view partly broken away on the line 16—16 of Fig. 14.
Figure 17:
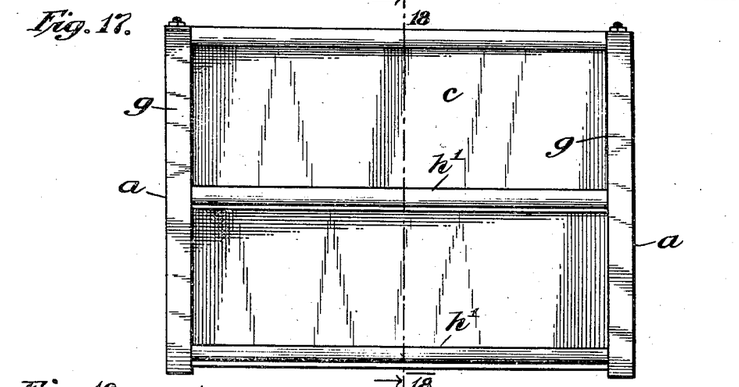
Fig. 17 is a front elevation of another modification of the case.
Figure 30:
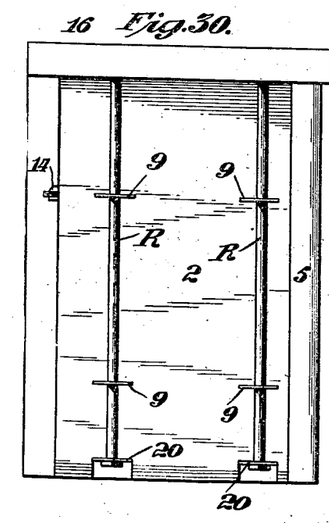
Fig. 30 is an inside elevation of one side.
Figure 31:
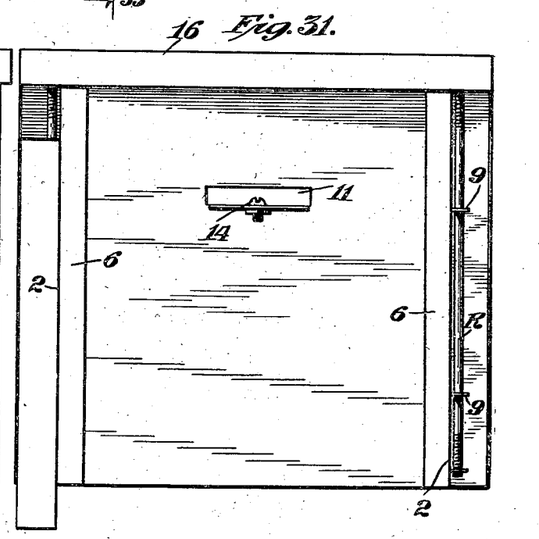
Fig. 31 is a rear elevation of the case.

In the structures made according to our invention the interior wall of the side may be either a single piece of metal with suitable slots or openings, to receive parts of the shelves (Fig. 5) or it may comprise several parts with edges suitably bent and perforated to receive the rods (Fig. 10). And where as shown by Figs. 20 and 22 the rods are engaged in perforations in the horizontally bent portions of the exterior sides, and the interior sides have consequently no essential office in holding the structure together, the interior wall may be built up of suitably formed panels inserted between the shelves and held in place by friction or any other way. In such cases they will naturally assist in supporting the shelves, but they have no part in holding the structure together and are merely fillers and they can be omitted entirely. And where the interior wall is bent at the end to form a horizontal flange and which through a perforation engages the rod (Fig. 30), the exterior wall may be dispensed with, especially if the structure made according to our invention is to be inclosed in another form of construction.

When we speak of shelves, we desire to be understood as including all the horizontal, flat surface members of the structure comprising our invention, for it is obvious that if a cabinet be constructed without a shelf, the top and bottom may serve the same purpose as a shelf to engage the rods, and when we speak of sides, except when we specifically use the term "back", we desire also to be understood as including the back which is obviously a side in the rear.

A full description of our invention illustrating the various parts and showing how they are made and assembled follows:

Figure 1:
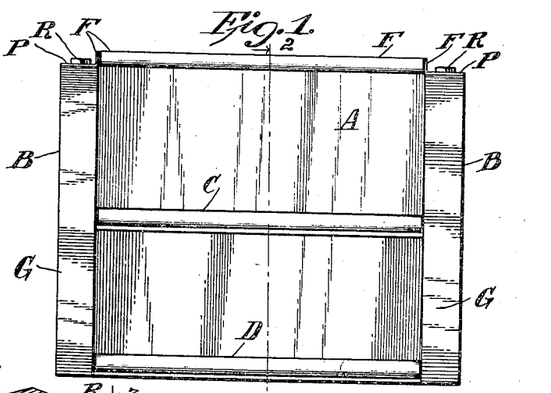
Fig. 1 is a front elevation of a case embodying the invention.
Figure 2:
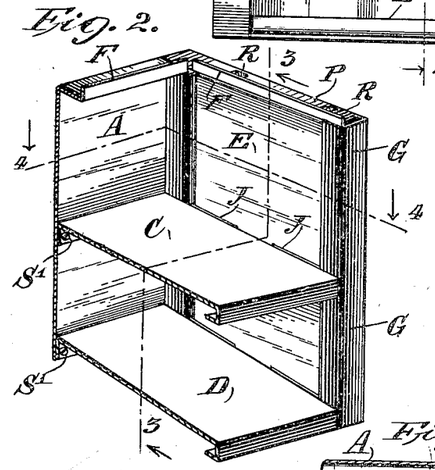
Fig. 2 is a vertical sectional perspective view of the case on the line 2—2 of Fig. 1.
Figure 3:
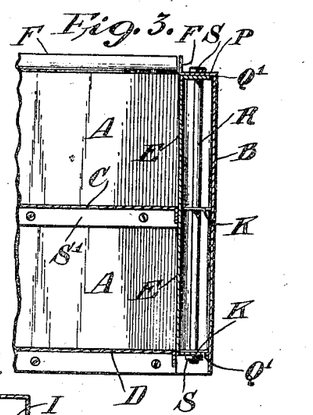
Fig. 3 is a vertical sectional view of the case partly broken away on the line 3—3 of Fig. 2.
Figure 4:
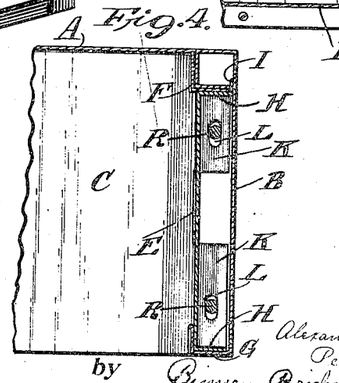
Fig. 4 is a horizontal sectional view partly broken away on the line 4—4 of Fig. 2.

Referring to the drawings, Figs. 1 to 8 inclusive, A represents the back of the sheet metal case, B the sides, C one of the shelves, and D another shelf or the bottom. Within the sides are arranged the panels or interior walls E. The sides and back are interfitted at the corners to form mutual bearing portions, and this is accomplished by suitably bending the edges of the sides and back to interfit or interlock as illustrated in plan view in Fig. 4. The sides and top of the back A are bent to form a box so that the back A may be set in between the sides bringing the surface of the back substantially flush with the sides. The particular way in which the marginal bends of the sides and back are formed may be varied as desired to accomplish the ends in view. The front edges of the sides B are also inwardly bent preferably to form L-shaped flanges G, and the side panels E are adapted to be inserted between the front and rear marginal flanges of the sides as illustrated in Fig. 5. The side panels E are suitably formed out of sheet metal with the edges bent to form flanges H, and preferably one flange is provided with a foot or extension I adapted to coöperate with the rear marginal bend of the side B as shown in Fig. 4 to hold the panel in place although the extension I is not essential. These panels E are inserted in the sides as illustrated in Fig. 5 from the bottom, although they could be inserted from the top if desired, and the construction of the side could be accordingly modified for this purpose.

The panels E as shown are provided with slots J at the height indicated for the shelves, and as shown the shelves C are provided with tongues K adapted to be inserted in the slots J when the parts are assembled. The tongues K are provided with slots L adapted to register with the apertures O in the top flanges P provided on the sides B, and these slots L also register with the apertures Q in the top and bottom flanges Q' of the side panels. When the sides and back and shelves with the side panels are to be assembled to form a case, the panels are inserted in the sides, one side flange of the back is fitted to the side, the tongues K of the shelves are inserted in the slots J of the panel, and then the other side is fitted to the back and shelves by inserting the remaining tongues of the shelf in their corresponding slots in the side. The binding rods R are then inserted through the registering apertures O and Q in the sides and panels and through the corresponding slots L in the shelves, thereby securely binding all the parts together. The binding rods are preferably screw-threaded at their ends to receive nuts S to hold the rods in place. The slots L in the lugs K on the shelves are preferably elongated as shown to afford clearance for the binding rods making it easy for the rods to find the holes.

In accordance with this construction it will be seen that the back A of the case is interfitted with the sides and held between the sides and interior panels. It will also be seen that the shelves bind the parts together in coöperation with the binding rods R. By removing the binding rods the metallic case may be knocked down ready for shipment. If desired, the shelves may be provided with rear flanges S' adapted to be screwed or otherwise secured to the back A, but these fastening devices may be omitted if desired. Preferably the front flanges G of the sides B are slotted at T in position to register with the slots J of the interior panels, and the tongues K at the front of the shelves extend to the front edges of the shelves, and coöperate with the slots J and T so that the front edges of the shelves are substantially flush with the front edges of the sides when the parts are assembled. The rear edges of the shelves are preferably recessed at the corners at U to accommodate the inwardly bent flanges of the sides and back at the rear corners of the case.

In the case illustrated in Figs. 9 to 16 inclusive, the construction is substantially like that illustrated in the first eight figures with the exception that instead of providing single interior panels for each side, these panels are made in sections V, each section corresponding to the height between the shelves. The front flanges G of the sides of the case are slotted as before at T to accommodate the lugs on the shelves, which lugs are inserted between adjacent interior panels V instead of in slots in the panels as in the construction first described. The shelves C are preferably provided with continuous lugs K' at each end, which are recessed at the rear portions at U' to accommodate the inwardly bent flanges of the sides and back at the rear corners. The binding rods R pass through the top flanges P of the sides B, through the apertures Q in the side panels V and through the slots L in the shelves, thus binding all the parts together.

In the construction so far illustrated and described the binding rods R may be located intermediate the length of the sides B at suitable intervals instead of at the corners of the case, but in the illustration of the invention shown in Figs. 17 to 28 inclusive, the construction is such that the binding rods are located at the corners of the case instead of at intervals intermediate the length of the sides.

Figure 25:
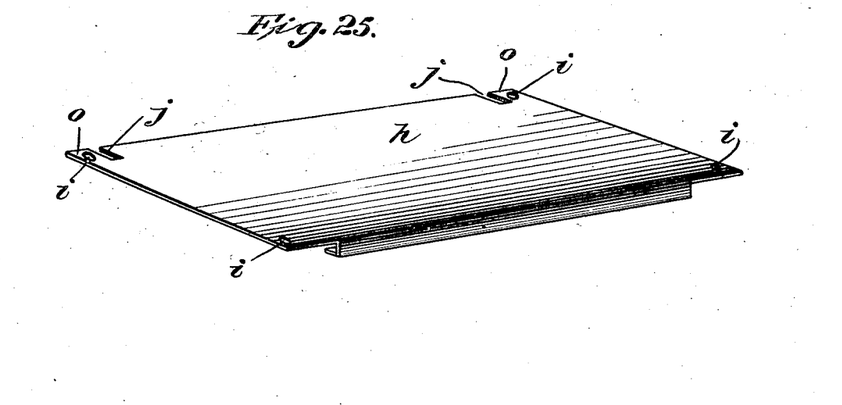
Fig. 25 is a perspective view of the shelf.
Figure 26:
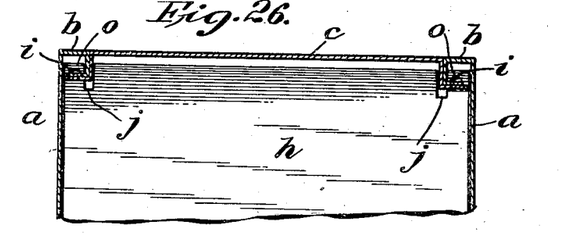
Fig. 26 is a horizontal sectional view, partly broken away, showing the corner construction.
Figure 27:
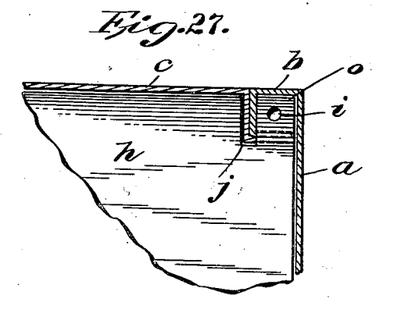
Fig. 27 is an enlarged detail horizontal sectional view partly broken away of one corner.
Figure 28:
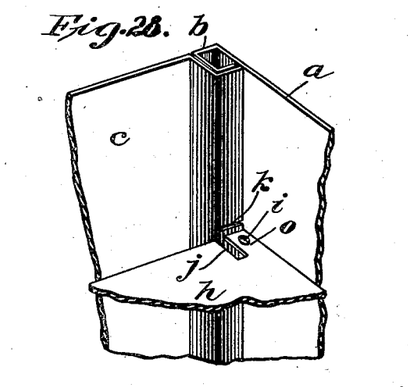
Fig. 28 is a detail perspective view partly broken away of one corner.
Figure 29:
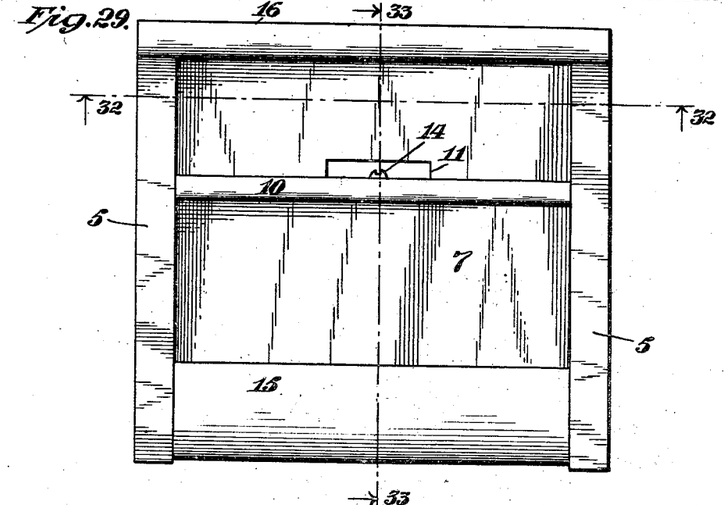
Fig. 29 is a front elevation of another modification of the case.

In Figs. 17 to 28 inclusive, the sides and back in the construction shown are interfitted as before, but in this instance in a somewhat different manner. As shown, in Fig. 20 the sides $a$ are provided with inwardly bent flanges $b$ at the rear corners, and the back $c$ is provided with inwardly bent hook shaped flanges $d$, which hook over the flanges $b$ of the sides. The sides are also provided with interior panels $e$, in this instance shown in sections corresponding to the height of the shelves, and these panels are provided with side and top and bottom flanges. If desired each panel may be in one piece. The flanges at one side of the panels $e$ are preferably provided with extensions or feet $f$ adapted to interfit with the inwardly bent front flanges $g$ of the sides, although these feet are not essential. The ends of the shelves $h$ are provided with apertures $i$ at the corners, and as shown in Fig. 25 the rear corners of the shelves are slotted at $j$, while the rear flanges of the sides and back are slotted at $k$ and adapted to receive the tongues $o$ of the shelves $h$ as indicated in Fig. 28. The slots $j$ embrace portions of the flanges of the sides and back at the rear corners of the case, so that the apertures $i$ in the shelves fall within the corners of the case inside of the corner flanges. The front flanges $g$ of the sides are also slotted at $p$ to receive the front corners of the shelves and permit the apertures $i$ therein to fall within the front flanges of the sides. The binding rods R pass downwardly within the corner flanges of the case through apertures in the top and bottom of the case and through the apertures $i$ in the shelves, thereby binding the parts together. If desired, the slots $j$ in the rear corners of the shelves may be omitted and the rear flanges of the sides and the flanges of the back may be slotted at $q$ to receive the corners of the shelf $h'$ shown in Fig. 24.

Figure 32:
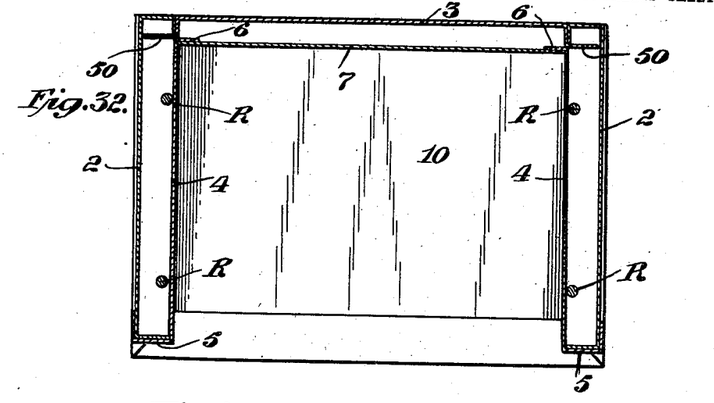
Fig. 32 is a horizontal sectional view on the line 32—32 of Fig. 29.
Figure 33:
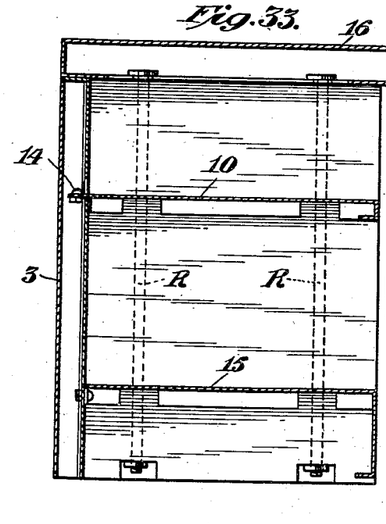
Fig. 33 is a vertical sectional view on the line 33—33 of Fig. 29.
Figure 34:
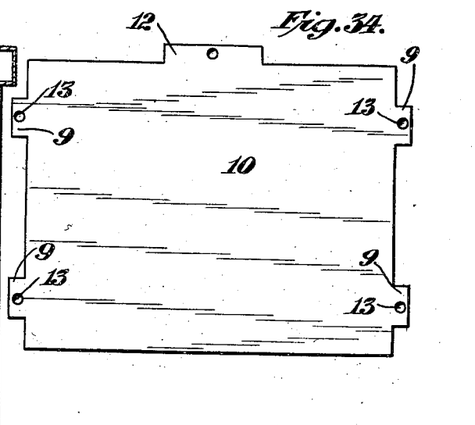
Fig. 34 is a plan view of one of the shelves.
Figure 35:
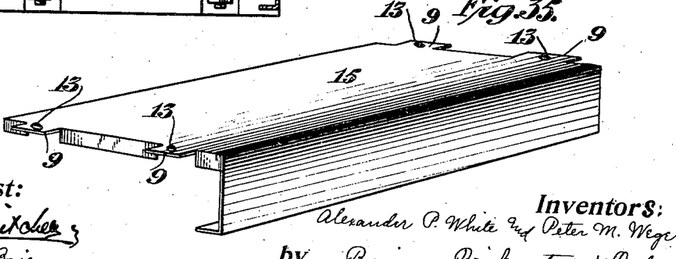
Fig. 35 is a perspective view of the bottom.

In Figs. 29 to 37 inclusive a modified form of construction is shown in which the sides and back are suitably interfitted. The sides 2 are provided with inwardly bent rear flanges and the back 3 is provided with inwardly bent flanges 50 interfitted therewith as shown in plan view in Fig. 32. The side panels 4 instead of slipping inside of the sides 2 are interfitted with the sides. As shown, the front edges of the panels 4 are bent into U-shaped form and these flanges 5 inclose the front ends of the sides as illustrated in Fig. 32. The rear edges 6 of the panels extend inwardly and form a support for the false back 7. The side panels 4 are provided with apertures 8 to receive the lugs 9 on the shelves 10 and the false back 7 is provided with an aperture 11 to receive the lug 12 on a shelf. These lugs 9 and 12 are provided with apertures 13 for the reception of screws, rivets or other binding devices 14, or else the binding rods R may be passed through the apertures 13 of the lugs 9 inside of the panels 4 to hold the parts together. The bottom 15 of the case is also provided with lugs 9, having apertures 13 to receive the binding rods R. The top of the case 16 is provided with inwardly bent flanges 17, which are slotted at the ends at 18, and adapted to be slipped over the upper ends of the binding rods and held in place by the nuts 19. A detail of this top construction is shown in Fig. 27. The side panels 4 are provided with lugs 20 turned at right angles to the plane of the sheet to afford a hold for the binding rods R, or other fastening devices. If desired, the flanges as P on the sides formed by bending the entire width of the side may be modified to take the form of lugs or ears 20 for the bending rods.

I claim and desire to obtain by Letters Patent the following—

1. In a metallic case or like device, the combination of a rod, and a side and shelf locked together by means of said rod, said rod passing through apertures in interfitting parts of the side and shelf.

2. A metallic case or like device, having a side and end fastened by means of interfitting parts, a shelf, and a rod passing through the side, end and shelf to hold them in position.

3. A metallic case or like device, having interfitting sides and back, a shelf supported on the sides, a top and bottom arranged within the sides and vertical rods passing through the top, the bottom and the shelf to bind the parts together.

4. In a metallic case or like device, the combination of sides with bent edges containing slots adapted to receive the edge of a top, a top containing an aperture in its edge adapted to receive a rod, and a rod passing through said aperture, thus holding the top and sides together.

5. In a metallic case or like device, the combination of sides with bent edges containing slots adapted to receive the edge of a bottom, a bottom containing an aperture in its edge adapted to receive a rod, and a rod passing through the said aperture, thus holding the sides and bottom together.

6. In a metallic case or like device, the combination of sides with bent edges containing slots adapted to receive the edge of a shelf, a shelf containing an aperture adapted to receive a rod, and a rod passing through said aperture, thus holding the sides and shelf together.

7. In a metallic case or like device, a side provided with an edge bent to receive a rod, said side having a slot in the bent portion thereof to receive the edge of the shelf, a shelf with an aperture in its edge and a rod passing through said aperture, thus fastening the shelf and side together.

8. A metallic case or like device, having the sides and back provided with interfitting flanges, a shelf and bottom and top all interfitting with the sides, and rods for binding the parts together by passing through apertures in the top and bottom.

9. A metallic case or like device formed of sheet metal, having at least one of its vertical sides bent horizontally, and having an aperture in the portion so bent, a shelf containing an aperture and a rod passing through both of said apertures to bind the parts together.

10. A metallic case or like device, having its opposite parallel interior sides bent outwardly at the top to form horizontal flanges provided with apertures, the said sides having slots to receive a shelf, the edge of the shelf having apertures and rods passing through said apertures binding the parts together.

11. In a metallic case or like device, a corner formed at the junction of two sides, by bending the edges to make a mutual bearing, a shelf with an aperture, and a rod engaging the sides and passing through the said aperture in the shelf, the shelf having an edge fitted into a slot in the bent portion of at least one of the sides.

12. A metallic case or like device, having its opposite interior walls made up of panels with top and bottom edges bent to form flanges provided with apertures, opposite exterior sides with vertical marginal flanges having slots in the flanged portions of the sides to receive a shelf, a shelf with apertures to receive rods and rods passing through the apertures in the shelf to bind the parts together.

13. A metallic case or like device, having a back and sides provided with interfitting flanges, interior panels for the sides, a shelf interfitting with said panels and rods engaging said shelf inside of the panels for binding the parts together.

14. A metallic case or like device formed of sheet metal, having at least one of its vertical sides bent horizontally, and provided with an aperture in the portion so bent, a panel with an edge bent to form a flange with an aperture in the bent edge portion, and a rod passing through the said apertures to bind the parts together.

15. A metallic case or like device, having a back and sides of marginally flanged interfitted metallic sheets, interior panels for the sides, a shelf supported in slots in said interior panels and rods passing through apertures in said shelves for binding the parts together.

16. A metallic case or like device, having a back and sides of marginally flanged interfitted metallic sheets, interior panels for the sides, a shelf supported in slots in said panels, and rods passing through apertures in the sides and in the shelves for binding the parts together.

17. A metallic case or like device formed of metallic sheets and having an interior panel provided with a flange containing an aperture to receive a rod, a top containing an aperture and fitting with a side containing a suitably flanged edge having an aperture therein, a rod passing through the aperture in the top and through the aperture in the flanged edge of the side and through the panel, for binding the parts together.

18. A metallic case or like device, having opposite interior walls made of panels with top and bottom edges bent to form flanges provided with apertures, the body of the panels having slots to receive the edges of a shelf, a shelf with apertures and rods passing through the apertures in the shelf and the apertures in the flanges of the panels to bind the parts together.

19. A metallic case or like device having at least one interior wall bent at one end to form a flange having an aperture, a panel, having a slot to receive a shelf, a shelf with an aperture and a rod passing through the aperture in the bent flange of the wall and through the aperture in the shelf to bind the parts together.

20. A metallic case or like device, having its opposite parallel exterior sides bent inwardly at the top to form a horizontal flange provided with apertures to receive rods, interior panels in the sides, a shelf fitted into slots in said interior panels, said shelf having apertures to receive the rods, and rods passing through the apertures in the bent portion of the top and through the apertures in the shelf, thus binding the parts together.

21. In a metallic case or like device formed of metallic sheets, the combination of the sides having interior panels, a shelf interfitting with said panels and rods engaging the said shelf for binding the parts together.

22. A metallic case having at least one interior wall made with a single panel with top and bottom edges bent to form flanges provided with apertures, the body of the panel having a slot to receive a shelf, a shelf with an aperture and rods passing through the apertures in the flanged portion of the panel and through the aperture in the shelf to bind the parts together.

23. A metallic case or like device having a side and a back provided with interfitting flanges, interior panels for the side, a shelf supported between said panels and rods engaging the shelf for binding the parts together.

24. In a metallic case or like device formed of metallic sheets, the combination of sides, and interior panels for at least one side, a shelf supported between said panels and rods engaging the shelf for binding the parts together.

25. A metallic case or like device formed of metallic sheets, having interfitted flanged corners and interior panels for at least one side, a shelf supported in slots in the flanged corners of the case and rods engaging the shelf for binding the parts together.

26. A metallic case or like device, having exterior sides formed of sheets of metal, with its opposite interior walls made of a plurality of panels with top and bottom edges bent to form flanges provided with apertures, a shelf between said panels, the shelf having apertures and rods passing through said apertures to bind the parts together.

27. A metallic case or like device having a side with a flanged edge provided with an aperture to engage a rod, a top fitted to the side and having an aperture to engage a rod, a tongue attached to the side and having an aperture therein to engage a rod and a rod passing through all said apertures.

28. A metallic case or like device having a side with a flanged edge provided with an aperture to engage a rod, a bottom fitted to the side and having an aperture to engage a rod, a tongue attached to the side having an aperture therein, and a rod passing through all said apertures.

In testimony whereof we have signed this specification in the presence of two subscribing witnesses.

ALEXANDER P. WHITE.

Witnesses:
J. H. KNOWLSON,
H. E. WHITE.

PETER M. WEGE.

Witnesses:
H. G. OGDEN,
A. L. O'BRIEN.